F. A. ADAMS.
CONTRACTING DEVICE FOR PISTON RINGS.
APPLICATION FILED DEC. 29, 1914.
1,148,472.
Patented July 27, 1915.
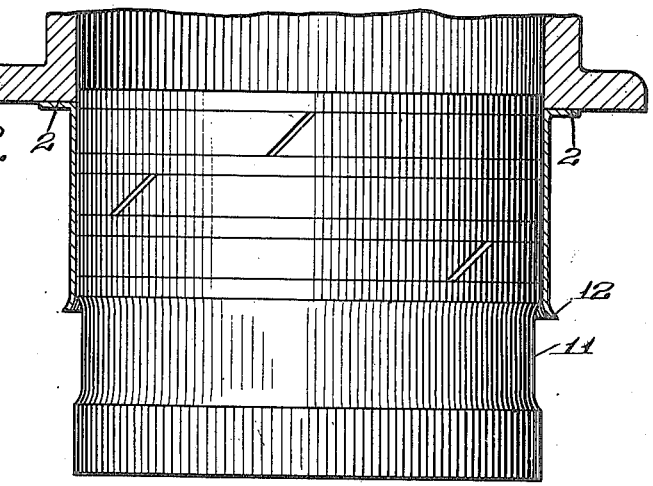
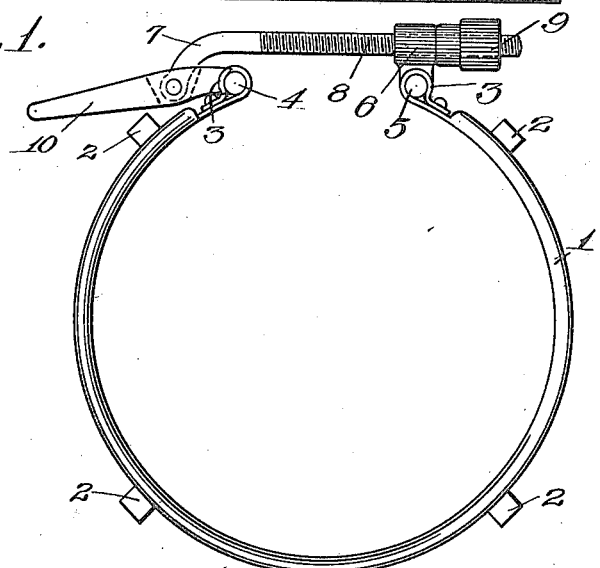
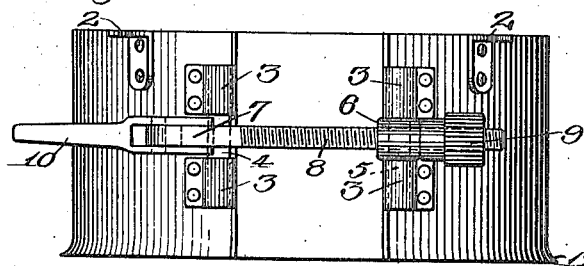
Inventor
FRANK A. ADAMS

UNITED STATES PATENT OFFICE.

FRANK A. ADAMS, OF ROCHESTER, NEW YORK.

CONTRACTING DEVICE FOR PISTON-RINGS.

1,148,472.

Specification of Letters Patent.

Patented July 27, 1915.

Continuation of application Serial No. 655,429, filed October 18, 1911. This application filed December 29, 1914. Serial No. 879,978.

*To all whom it may concern:*

Be it known that I, FRANK A. ADAMS, of Rochester, in the county of Monroe and State of New York, have invented certain new and useful Improvements in Contracting Devices for Piston-Rings; and I do hereby declare the following to be a full, clear, and exact description of the same, reference being had to the accompanying drawings, forming a part of this specification, and to the reference-numerals marked thereon.

The present invention relates to a device for contracting piston rings, and it has for its object to provide a simple and expedient means for holding the expansible packing rings of a piston in close engagement within the recesses of the piston, as the latter is inserted into its cylinder, in the assembling of the engine parts.

To these and other ends the invention consists in certain improvements and combinations of parts all as will be hereinafter more fully described, the novel features being pointed out in the claims at the end of the specification.

In the drawings: Figure 1 is a view in side elevation of one embodiment of my invention; Fig. 2 is a sectional view, partly in elevation, showing the application of the invention to a piston and cylinder, and Fig. 3 is a plan view of the device shown in Fig. 1.

Similar reference numerals throughout the several figures indicate the same parts.

The invention may be illustrated by the present embodiment, in which there is provided a ring engaging member 1, preferably comprising a band, which may be formed of sheet metal and is more or less flexible. The band 1 is provided with a series of lugs 2 by which it is positioned against the cylinder, as shown in Fig. 2, and the ends of the band have lugs 3 bent back upon and suitably attached to the body portion to form bearings for the pintles 4 and 5.

Pivotally attached to the pintle 5 is a collar 6 which is engaged by an arm 7 having a threaded portion 8, the arm being adjustable relatively to the collar and held in adjusted position by means of the threaded nut 9. Pivoted to the opposite end of the arm 7 is the lever 10 which has a concave end adapted to engage the pintle 4, as shown in Fig 1.

In the operation of the device, the band is first positioned around the piston and the lever forced downwardly to the position of Fig. 1, the adjusting nut being thereupon tightened to cause the band to fit tightly around the piston. The lever is then released and the device removed, to enable the rings to be applied to the piston, after which it is again positioned around the piston, and the lever operated to engage the pintle 4 and force the opposite ends of the band toward each other, thus tightening the band and contracting the rings within the grooves of the piston, so that the latter may be moved into the cylinder, the respective rings being held within the recesses until they are entirely within the cylinder, after which they are free to expand and engage the walls of the cylinder.

Most pistons are provided with peripheral oil recesses for lubricating the cylinder, as indicated at 11, and as the piston moves relatively to the ring engaging member, there is a possibility of the latter engaging the recess, owing to the flexibility of and tension exerted on the band, unless some means are provided for overcoming it, and to this end, there is provided, in the present embodiment, a beveled or flaring portion 12 at the outer edge of the band, as shown in Fig. 2. By such construction, if a shoulder on the piston is presented to the band, the beveled or flaring portion of the latter will meet the shoulder, permitting the piston to move within the band and thus obviate any locking of the parts. After the piston has been moved within the cylinder, the device is removed by simply throwing back the locking lever beyond its dead center or locking position, so that the one end of the band is released, and the latter may be then pulled off from the piston.

The advantages of the invention, as illustrated in the embodiment herein shown and described, are that the device is applicable in its use to pistons of varying diameters, being readily adjustable from one size to another, and that it may be quickly applied to or removed from a piston. This is essential, especially where the space between the engine parts does not permit sufficient removal of the piston from the cylinder to position the device over the end of the piston so that the device must be slipped on from one side.

A further advantage resides in the provision of means whereby the possibility of locking engagement between an oil recess of the piston and the edge of the ring engaging member is effectively overcome.

I claim as my invention:

1. A piston ring contracting device comprising a flexible ring engaging member having separable ends, cylinder engaging means at one side of the ring engaging member, a beveled or outwardly flaring portion at the opposite side of the same, and means for drawing the ends of the ring engaging member toward each other.

2. A piston ring contracting device comprising a flexible ring engaging member having separable ends, a lever pivotally mounted on an arm having an adjustable pivotal connection with one end of the ring engaging member, said lever being positioned to engage an abutment on the opposite end of the ring engaging member for effecting movement of said ends toward each other, cylinder engaging means at one edge of the ring engaging member, and a beveled or outwardly flaring portion at the opposite edge.

FRANK A. ADAMS.

Witnesses:
G. WILLIARD RICH,
RUSSELL B. GRIFFITH.